United States Patent
Stokes et al.

(10) Patent No.: US 6,295,388 B1
(45) Date of Patent: Sep. 25, 2001

(54) METHOD FOR SELECTING AN AREA OF FULL RESOLUTION IMAGE DETAIL FOR VIEWING DURING SCANNING

(75) Inventors: Earle B. Stokes, Berchem (BE); John F. Omvik, North Andover, MA (US); John A. Merecki, Brentwood, NH (US)

(73) Assignee: Agfa Corporation, Wilmington, MA (US)

( * ) Notice: Subject to any disclaimer, the term of this patent is extended or adjusted under 35 U.S.C. 154(b) by 643 days.

(21) Appl. No.: 08/661,261

(22) Filed: Jun. 10, 1996

(51) Int. Cl.$^7$ .................................................. G06K 7/00
(52) U.S. Cl. .................................................. 382/312
(58) Field of Search .................................... 382/312, 162, 382/168; 348/565; 358/524, 401, 522; 395/128, 139

(56) References Cited

U.S. PATENT DOCUMENTS

| | | | |
|---|---|---|---|
| 4,656,524 | * 4/1987 | Norris et al. | 358/401 |
| 4,837,635 | 6/1989 | Santos | 358/401 |
| 4,888,812 | 12/1989 | Dinan et al. | 382/140 |
| 5,065,346 | * 11/1991 | Kawai et al. | 395/128 |
| 5,185,662 | * 2/1993 | Liston | 358/524 |
| 5,222,154 | * 6/1993 | Graham et al. | 382/162 |
| 5,276,788 | * 1/1994 | Stapleton | 395/139 |
| 5,612,715 | * 3/1997 | Karaki et al. | 348/565 |

* cited by examiner

Primary Examiner—Jose L. Couso
Assistant Examiner—Anh Hong Do
(74) Attorney, Agent, or Firm—John A. Merecki; Edward L. Kelley

(57) ABSTRACT

A detail area of a low resolution preview scan is selected to determine the quality of a subsequent high resolution scan. A detail window containing high resolution image data corresponding to the selected detail area is displayed as soon as it becomes available during the high resolution scan. Based on the quality of the high resolution image data displayed within the detail window, the scanning operator can prematurely terminate the high resolution scan of the image prior to completion.

10 Claims, 4 Drawing Sheets

FIG. 2
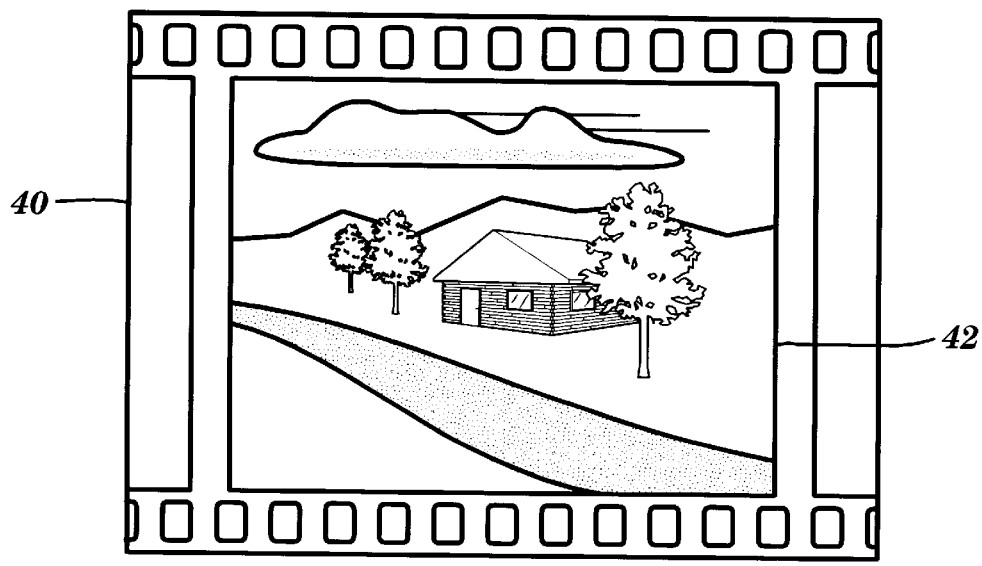
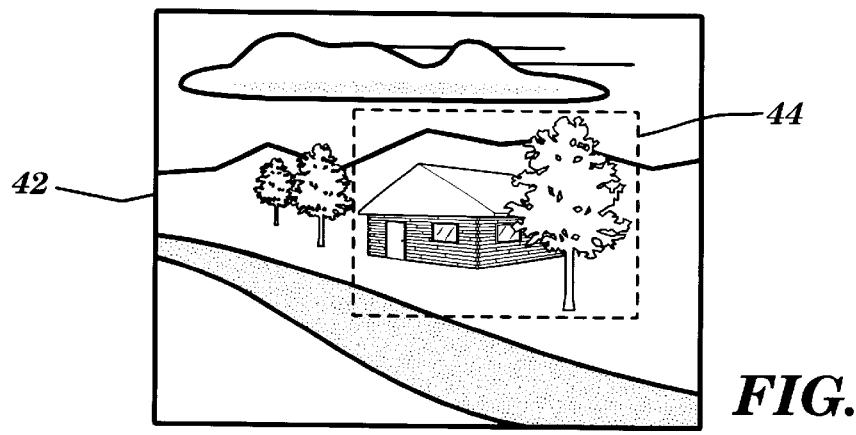
FIG. 3
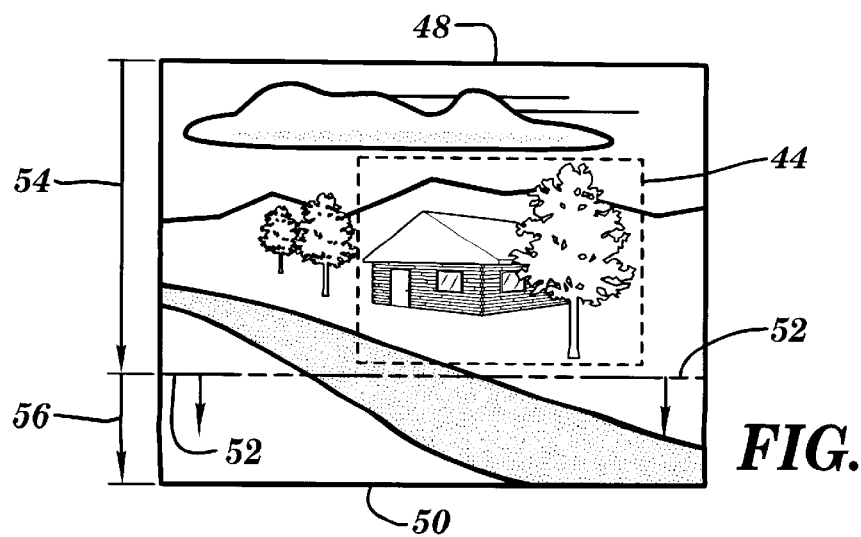
FIG. 4

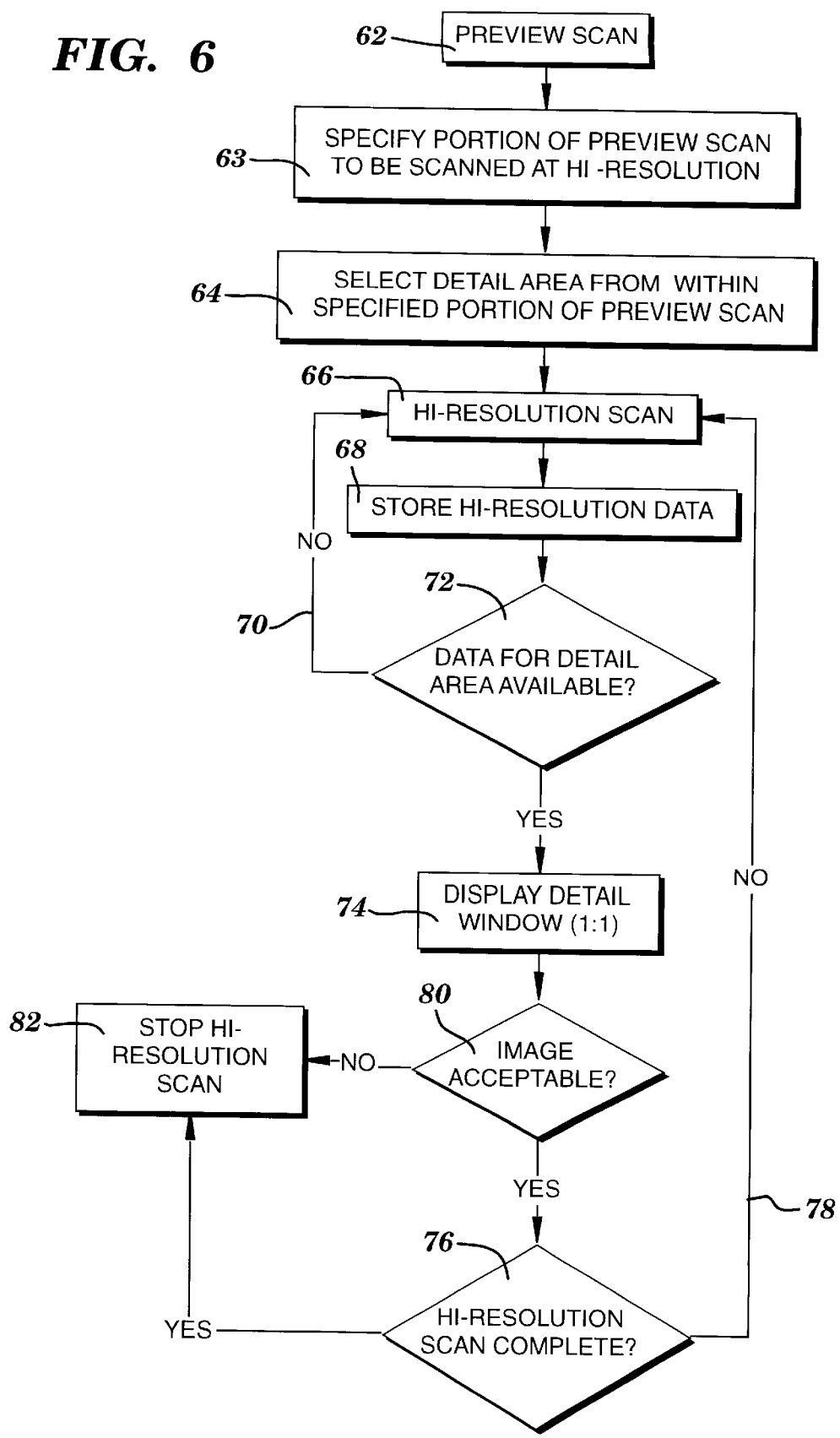

METHOD FOR SELECTING AN AREA OF FULL RESOLUTION IMAGE DETAIL FOR VIEWING DURING SCANNING

FIELD OF THE INVENTION

The present invention relates in general to scanning systems. More specifically, the present invention provides a method for selecting and viewing a portion of a scanned image in full resolution during scanning to simplify the workflow and computing resources required to perform a quality check on the scanned image.

BACKGROUND OF THE INVENTION

Acquiring high resolution digital image data from a scanner is traditionally done in a multiple step process. Usually a low resolution image is scanned, on which cropping, rotation, and other image processing operations are performed. Once the operator is pleased with the result on the low resolution image, a final image is scanned at higher resolution. The image processing steps performed on the low resolution image are automatically applied to the high resolution image during or after it is scanned.

The high resolution image may be scanned directly to disk, or it may appear in the operators window. Regardless of the output location, the high resolution image usually must be checked for image quality, since there are details in the high resolution image that cannot be seen in the low resolution version, and some image processing operations are resolution dependent, like descreening and unsharp masking. These operations cannot be accurately previewed on the low resolution image. A sample of the image may be scanned at high resolution, before scanning the entire image at high resolution, but this can be very time consuming relative to scanning the whole image with the hope that the quality will be good enough. The final quality check requires the operator to wait while the relatively large high resolution image is scanned, processed and displayed on his screen. Or, the operator must reload the final image at a later time.

Viewing these large images usually involves examining a scaled down version of the image, similar to the low resolution image, and selecting a portion of the image to view at full resolution. The scaled down version of the image is either made in advance and saved on disk, or created on the fly as the image is loaded from disk. These steps consume time and memory.

SUMMARY OF THE INVENTION

The present invention provides a method for selecting and viewing a detail area of a scanned image in full resolution during scanning to perform a quality check on the scanned image. The method generally includes the following steps:

1. Perform a low resolution preview scan on an image in a conventional manner, and display the low resolution image data of the preview scan.

2. Specify a portion (e g., via cropping) of the preview scan to be scanned at a high resolution.

3. Select at least one detail area within the specified portion of the preview scan to be examined in high resolution.

4. Perform a high resolution scan on the image based on the specified portion of the preview scan, and save the high resolution image data to disk.

5. Display the detail area in full resolution in a separate detail window after it becomes available during the high resolution scan of the specified portion of the preview scan.

6. Accept or reject the high resolution scan based on the quality of the image data in the detail window.

The present invention offers many advantages over the traditional quality checking approaches of the prior art. First, the invention allows an operator to specify at least one area of a low resolution scan that may need quality checking. This is done prior to a high resolution scan of the image. When the high resolution image data corresponding to a selected area is available, it is automatically displayed in a separate detail window, preferably at a 1:1 ratio (1 display pixel for 1 data pixel). The operator can then accept or reject the high resolution scan, based on the selected area of high resolution image data displayed in the detail window, without having to load into memory and view the entire high resolution image at a 1:1 ratio. Second, depending on the relative location of the selected area on the scanned image, the detail window may be displayed prior to the completion of the full high resolution scan. This will save scanning operators a significant amount of time by allowing them to cancel the high resolution scan at an early stage. Finally, the high resolution image data displayed in the detail window is "tapped" out during the high resolution scan, thereby requiring no additional scanning steps. If the high resolution image data displayed in the detail window is acceptable to the operator, no time has been lost since no extra scanning steps were needed to create these detail views.

BRIEF DESCRIPTION OF THE DRAWINGS

The features and advantages of the present invention will best be understood from a detailed description of the invention and a preferred embodiment thereof selected for the purposes of illustration and shown in the accompanying drawings in which:

FIG. 2 is a low resolution preview scan of an image, wherein a specified portion of the preview scan has been cropped for a subsequent high resolution scan;

FIG. 3 illustrates the selection of a detail area within the specified portion of the preview scan to be examined in high resolution;

FIGS. 4 and 5 illustrate the process whereby a detail window containing the high resolution image data corresponding to the detail area selected in FIG. 3 is displayed after it becomes available during the full high resolution scan of the specified portion of the preview scan;

FIG. 6 is a flowchart describing the method of the present invention; and

DETAILED DESCRIPTION OF THE INVENTION

Figure 1:
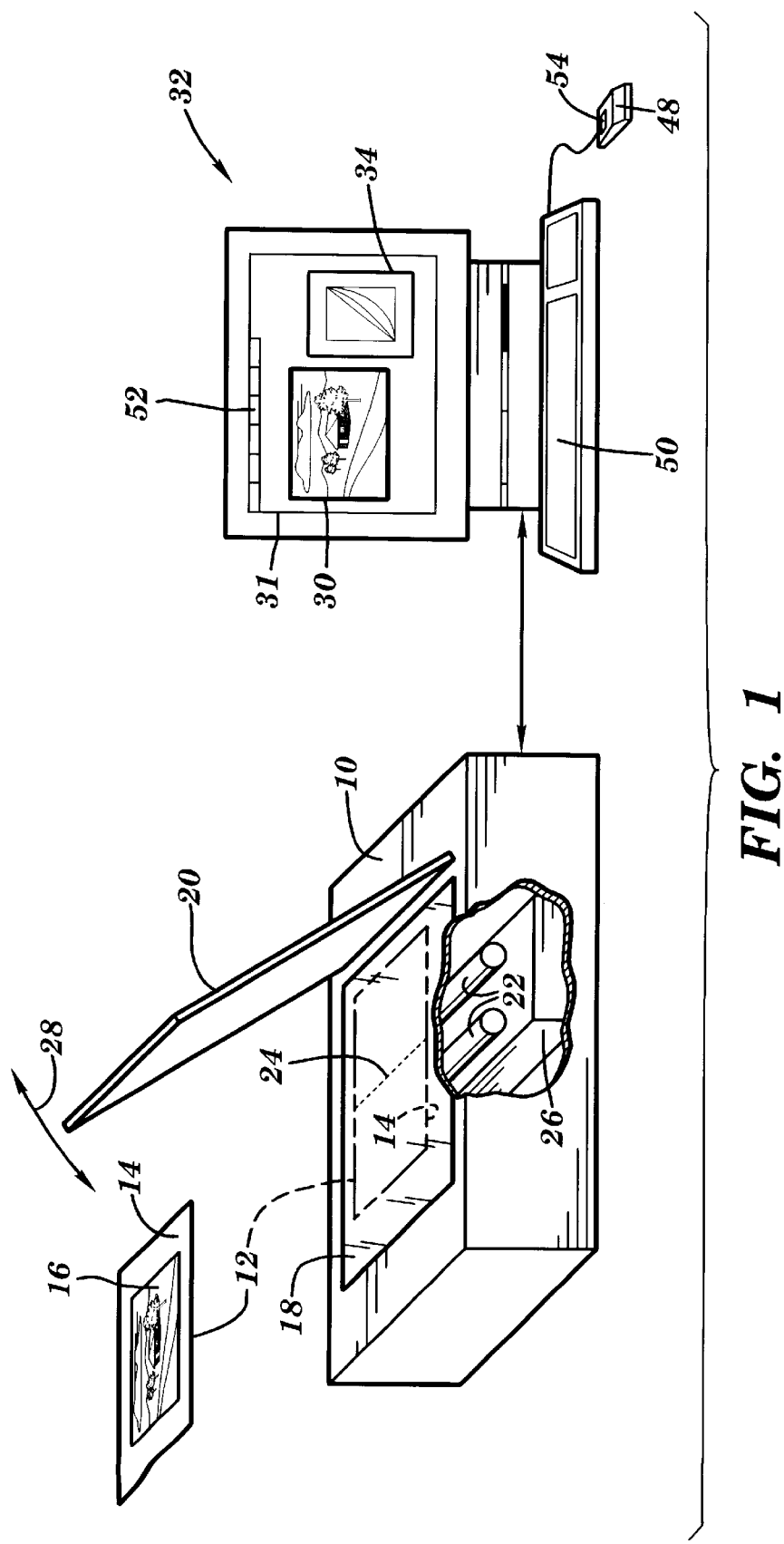
FIG. 1 illustrates a prior art scanning system including a scanner and a workstation.

Referring now specifically to the accompanying drawings, there is illustrated a method for selecting a detail area of full resolution image detail for viewing during scanning in accordance with the present invention, wherein like reference numerals refer to like elements throughout the drawings.

In FIG. 1, a scanning system 10 is configured for the scanning of a reflective original 12. The reflective original 12 is placed with the surface 14 containing the image 16 to be scanned facing down on a transparent scanning surface 18, and held in place by a cover 20. The surface is illuminated from below by lamps 22, producing a scan line 24. The scanning optics and sensor electronics are located in a scan module 26, which is driven together with lamps 22 to move the scan line 24 across the length of the original 12, thereby scanning the original 12 to produce a digital representation thereof. The cover 20 is pivotally secured on one side to the main body of the scanning system 10 via a hinge mechanism (not shown), thereby allowing the cover 20 to be raised and lowered (directional arrow 28) to position one or more reflective originals 12 on the transparent scanning surface 18.

A digital representation of an image 30, obtained, for example, using the above-described scanning system 10 (preview or final scan), is displayed on the display 31 of a workstation 32. An image modification tool 34, forming a portion of the scanner driver controlling the operation of the scanning system 10, or accessed via a stand-alone image editing program such as Adobe's PHOTOSHOP™, can be used if necessary, to modify various characteristics of the digital image 30.

The method of the present invention is shown in FIGS. 2–5. FIG. 2 illustrates a low resolution preview scan 40 of an image as displayed on the display 31 of the workstation 32. The image has been cropped 42 to specify the portion of the image to be scanned in high resolution. In FIG. 3, a scanning operator has selected at least one detail area 44 of the cropped portion 42 of the image to be viewed in high resolution during a subsequent high resolution scan.

Figure 5:
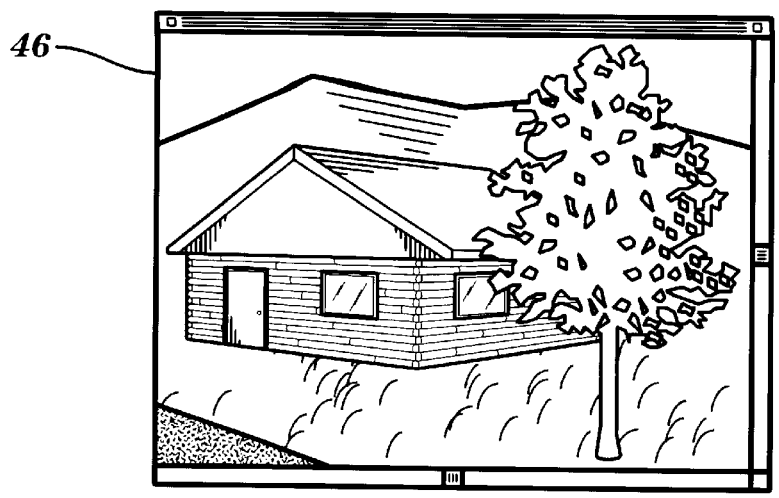

During the high resolution scan of the cropped portion 42 of the image, the high resolution image data is stored line by line to disk (not shown). As depicted in FIGS. 4–5, the high resolution image data corresponding to the detail area 44 is displayed in a separate detail window 46 after it becomes available during the high resolution scan. In this example, the high resolution scan of the cropped portion 42 of the image starts at the top 48 of the image and progresses downward toward the bottom 50 of the image. The high resolution scan continues in a normal manner, with the high resolution image data stored to disk, until the current scan line 52 passes beyond the detail area 44. The partially completed high resolution scan is indicated by arrow 54. At this point, the high resolution image data corresponding to the detail area 44 is output from disk and displayed within the detail window 46. If the quality of the image data within the detail window 46 is satisfactory, the high resolution scan continues (arrow 56) until the scan is complete. If the quality of the image data within the detail window 46 is unsatisfactory, however, the operator can prematurely terminate the scan.

A flowchart 60 describing the general operational flow of the present invention is illustrated in FIG. 6. A low resolution preview scan of an image is performed in block 62. The scanning operator examines the preview scan, specifies (block 63) a portion of the preview scan (e.g., via cropping) to be scanned at high resolution, and selects (block 64) at least one detail area within the specified portion of the preview scan for use in determining the quality of the high resolution scan. After selecting the detail area, the operator initiates the high resolution scan of the specified portion of the preview scan (block 66), with the high resolution scan data stored line by line to disk (block 68). The high resolution scan continues (loop 70) until the high resolution image data corresponding to the selected detail area is completely available (block 72).

At this point in the process, the high resolution image data corresponding to the selected detail area is read from disk and displayed in its entirety in a separate detail window (block 74). Meanwhile, the high resolution scan continues uninterrupted until complete (block 76, loop 78). However, if the high resolution image data displayed within the detail window is deemed unacceptable (block 80), the operator can prematurely terminate the high resolution scan (block 82).

Figure 7:
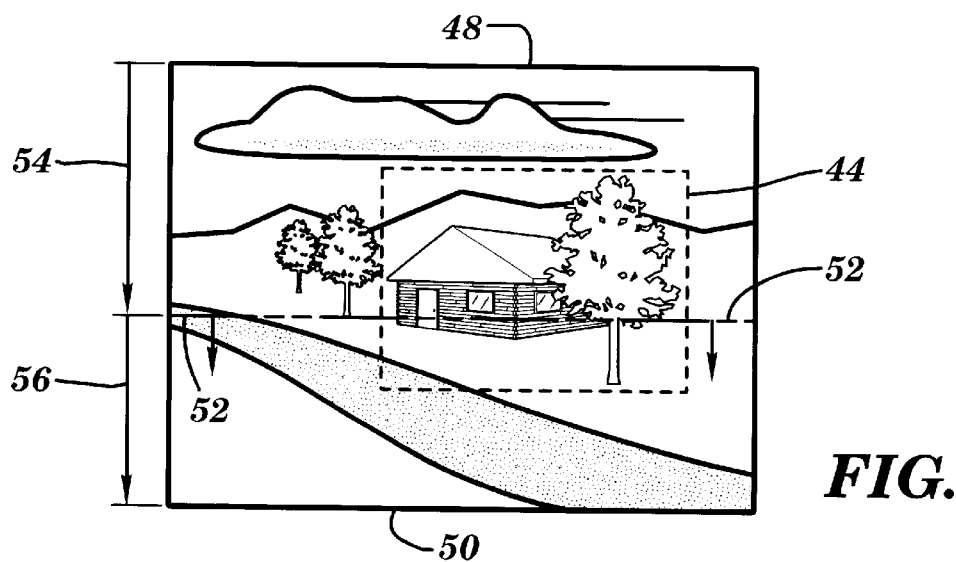
FIGS. 7 and 8 illustrate an alternate embodiment of the method of the present invention.
Figure 8:
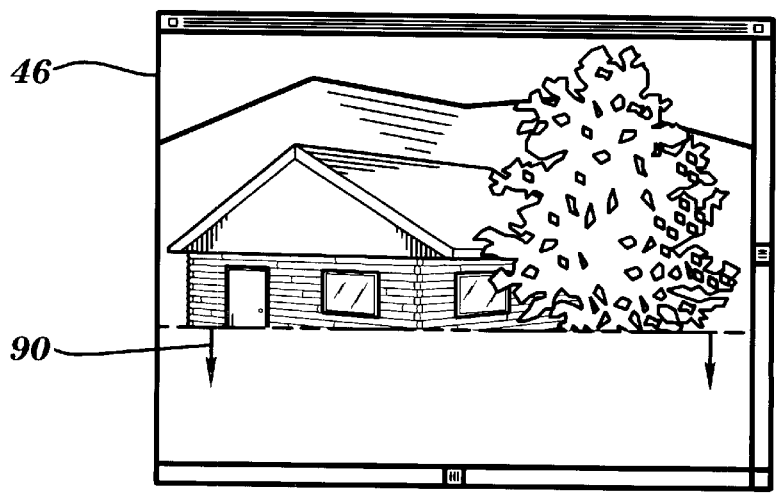

In an alternative embodiment of the present invention, the detail window 46 can be filled on a line by line basis with high resolution image data as the scan line 52 moves across the detail area 44. This is illustrated in FIGS. 7–8. As shown, the detail window 46 only contains high resolution image data for the previously scanned portion of the detail area 44. The amount of displayed high resolution data increases (arrow 90) as the current scan line 52 passes over the detail area 44. The high resolution image data for each scan line is preferably displayed in parallel with its storage to disk as soon as it is produced by the scanning system. In this embodiment, the scanning operator can reject or accept the results of the high resolution scan even before the detail window 46 has been completely filled with high resolution image data corresponding to the detail area 44.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

We claim:

1. A method for examining a high resolution scan of an image during scanning, comprising the steps of:

performing a low resolution scan on an image to obtain low resolution image data;

displaying said low resolution image data;

specifying a portion of said low resolution image data to be scanned at a high resolution;

selecting at least one detail area within said specified portion of said low resolution image data to be examined in high resolution;

performing a high resolution scan on the image based on the specified portion of said low resolution image data to obtain high resolution image data;

saving said high resolution image data; and displaying the high resolution image data corresponding to said detail area after it becomes available during the high resolution scan.

2. The method according to claim 1, further including the step of:

terminating the high resolution scan if the displayed high resolution image data corresponding to said detail area is unacceptable.

3. The method according to claim 2, further including the step of:

allowing the high resolution scan to continue uninterrupted if the displayed high resolution image data corresponding to said detail area is acceptable.

4. The method according to claim 1, wherein said step of displaying the high resolution image data further includes the step of:

displaying said high resolution image data at a 1:1 ratio on a display device having a plurality of display pixels, wherein each display pixel is used to display a pixel of said high resolution image data.

5. The method according to claim 1, wherein said step of displaying the high resolution image data further includes the step of:

displaying the high resolution image data corresponding to said detail area immediately after it becomes available during the high resolution scan of the image.

6. A scanning method comprising the steps of:

scanning an image at a first resolution to obtain low resolution image data;

displaying said low resolution image data;

specifying a portion of said low resolution image data to be scanned at a high resolution;

selecting at least one detail area within said specified portion of said low resolution image data to be examined in high resolution;

scanning said image, based on the specified portion of said low resolution image data, at a second, higher resolution to obtain high resolution image data;

saving said high resolution image data; and displaying, during said higher resolution scanning step, the high resolution image data corresponding to said detail area after it becomes available.

7. The method according to claim 6, further including the step of:

terminating said high resolution scanning step if the displayed high resolution image data corresponding to said detail area is unacceptable.

8. The method according to claim 7, further including the step of:

completing said high resolution scanning step if the displayed high resolution image data corresponding to said detail area is acceptable.

9. A method for examining a high resolution scan of an image during scanning, comprising the steps of:

performing a low resolution scan on an image to obtain low resolution image data;

specifying a portion of said low resolution image data to be scanned at a high resolution;

selecting at least one detail area within said specified portion of said low resolution image data to be examined in high resolution;

performing a high resolution scan on the image based on said specified portion of said low resolution image data to obtain high resolution image data;

displaying the high resolution image data corresponding to said detail area when it becomes available during the high resolution scan of the image; and terminating the high resolution scan of the image if the displayed high resolution image data corresponding to said detail area is unacceptable.

10. A method for examining a high resolution scan of an image during scanning, comprising the steps of:

performing a low resolution scan on an image to obtain low resolution image data;

specifying a portion of said low resolution image data to be scanned at a high resolution;

selecting at least one area within said specified portion of said low resolution image data to be examined in high resolution;

scanning said image line by line at a high resolution, based on the specified portion of said low resolution image data, to obtain a series of lines of high resolution scan data;

displaying each line of high resolution image data corresponding to said detail area as it becomes available during the high resolution scan of the image; and terminating the high resolution scan of the image if the displayed high resolution image data corresponding to said detail area is unacceptable.

* * * * *